Patented Feb. 16, 1943

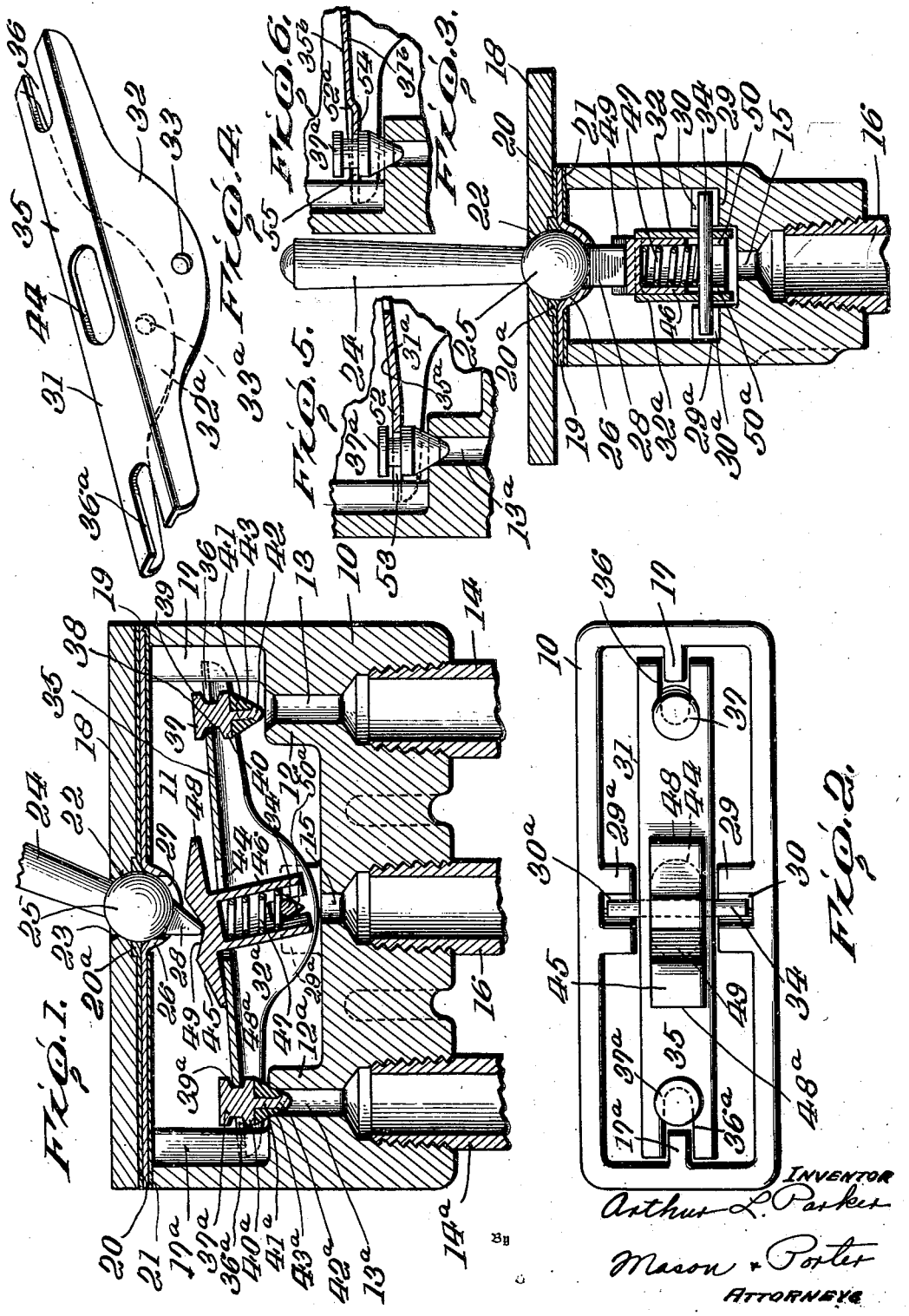

2,311,464

UNITED STATES PATENT OFFICE 2,311,464

VALVE ASSEMBLY

Arthur L. Parker, Cleveland, Ohio

Application December 13, 1939, Serial No. 309,083

16 Claims. (Cl. 277—20)

The present invention relates to new and useful improvements in a valve assembly, and more particularly to improvements in a valve assembly for selectively controlling the passage of fluid through a plurality of conduits.

In various installations which require the use of fluid under pressure, as for instance, compressed air, it is desirable to provide a plurality of separate fluid supply conduits, either from a single source of supply or from several sources of supply. The advantage of such a construction is that one or another of the supply conduits or sources of supply may be separately employed. Thus, if one supply conduit becomes clogged or damaged, another supply conduit can be immediately opened for use. Similarly, if one source of supply becomes out of order or otherwise inoperative, another supply conduit connected to a different source of supply may be opened for use. Such installations are desirable in various instances, as for instance, for selecting a source of air for operating a gage, and such a valve assembly is used in aircraft in connection with the air speed indicators. Of course, a valve assembly of this type may be used in other instances for operating or controlling various devices. The present invention is particularly concerned with the provision of such a valve assembly which includes a valve housing having a plurality of inlet ports in communication with the supply conduits. The housing is illustrated as including a single or common outlet port which is also in communication with a discharge conduit. The valve assembly also includes a valve mechanism mounted within the valve casing or housing, and this valve mechanism is adapted to selectively open or close one or another inlet port so that if one supply conduit or source of supply becomes out of order, the valve mechanism can be immediately shifted so as to close this supply conduit and open another.

An object of the present invention is to provide a valve assembly of the toggle type which includes a rockable member having valve means carried thereby for controlling the inlet ports in the valve casing.

Another object of the invention is to provide a valve assembly of the above type wherein valve plugs are carried by the rockable member and are capable of limited movement relative thereto so that these valve plugs are automatically centered relative to their seats whereby to effect a tight seal.

A further object of the invention is to provide a valve assembly of the above type wherein the rockable member is rapidly shifted by a snap action immediately after it passes from an intermediate neutral position to an extreme position with one of the valve plugs seated for closing a port.

A still further object of the invention is to provide a valve assembly of the above type wherein spring means are employed for rapidly shifting the rockable member from an intermediate position and wherein this spring means serves to exert a valve seating pressure on the rockable member in any closed position thereof.

A still further object of the invention is to provide a valve assembly of the above type wherein the rockable member is manually shiftable from one closed position to an intermediate neutral position from which the rockable member is rapidly shifted by spring action to another closed position.

The invention still further aims to provide a valve assembly of the above type which is simple in construction, relatively inexpensive to manufacture, and which is thoroughly efficient in use.

The above and other objects of the invention will in part be obvious and will be hereinafter more fully pointed out.

In the accompanying drawing:

Figure 1 is a longitudinal sectional view through the valve casing.

Figure 2 is a top plan view of Figure 1 with the cover plate removed, showing the valve mechanism.

Figure 3 is a central transverse section through the valve casing shown in Figure 1.

Figure 4 is a detail perspective view of the rocker arm.

Figures 5 and 6 are fragmentary detail views of modified forms of the rocker arm.

Referring more in detail to the accompanying drawing, the valve casing or housing includes a body portion 10 which is substantially rectangular in shape. The interior of the body portion 10 is shaped to provide an internal chamber 11 at the ends of which are elevated portions 12, 12a through which inlet ports 13, 13a extend. These inlet ports are in communication with suitable supply conduits 14, 14a. Centrally of the body portion 10, there is provided an outlet port 15 which is in communication with a suitable discharge conduit 16. The ends of the body portion 10 above the elevated portions 12, 12a are shaped to provide inwardly extending ribs 17, 17a. These ribs extend vertically and are disposed centrally between the sides of the body portion and serve as track or guide-ways in a manner to be hereinafter pointed out.

A cover plate 18 is secured to the body portion 10 in any suitable manner and a liner plate 19 is disposed between the cover plate and the sides and ends of the body portion. A sealing gasket 20 is disposed between the liner plate 19 and the cover plate 18, and a sealing gasket 21 is secured between the edges of the body portion 10 and the liner plate 19. The cover plate 18 is provided with a central opening therethrough and the inner edge 22 of this opening is arcuately shaped. The outer edge 23 of the opening may be in the form of a slot permitting movement of a hand operating member 24. The hand operating member 24 is provided with a spherical portion 25, the edges of which intimately fit the curved edge 22 of the opening through the cover plate. The liner plate 19 is provided with a depending central portion 26, the inner surface of which is also arcuately shaped to snugly fit and engage the spherical or ball portion 25 of the operating member 24. The portion 26 on the liner plate 19 is provided with a longitudinal slot 27 through which the wedge-shaped tip 28 of the operating member extends. The gasket 20 has associated therewith, either integrally or as a separate element, an enlarged central annular portion 20a which surrounds and intimately contacts with the ball portion 25 on the hand operating member so as to prevent leakage of fluid therethrough.

The sides of the body portion 10 are provided with centrally disposed and inwardly extending lugs 29, 29a which are provided with substantially V-shaped recesses 30, 30a. The recesses 30, 30a are open at the inner ends thereof and may be of any suitable shape. A rockable member 31 in the form of a rocker arm is provided with depending symmetrical flange portions 32, 32a which have openings 33, 33a, respectively, therethrough. These openings 33, 33a are centrally disposed with respect to the rocker arm, and a pin 34 is adapted to extend therethrough. The depending flanges 32, 32a on the rocker arm extend downwardly between the inner edges of the lugs 29, 29a on the body portion 10 and the ends of the pin 34 are disposed in the recesses 30, 30a in these lugs. Thus, the rocker arm 31 is mounted by means of the pin 34 and the recesses 30, 30a, for pivoted rocking movement within the chamber 11 provided by the body portion. The depending flanges 32, 32a are joined by a top portion 35 which forms the top of the rocker arm. The ends of the top portion 35 are provided with outwardly opening recesses 36, 36a therein. The sides of these recesses are spaced apart a distance sufficient to permit the ribs 17, 17a at the ends of the body portion to extend therein. Thus, the rib 17 cooperates with the recess 36 and the rib 17a cooperates with the recess 36a to provide guiding means for the rocker arm.

The recesses or slots 36, 36a on the rocker arm also serve to support the valve closing members which are in the form of valve plugs 37, 37a. Each valve plug is identical so that the description of one will serve for the other. The top of the valve plug 37 is substantially in the form of a spool and has an annular recess 38 which is defined by a central cylindrical portion and upper and lower flange portions 39, 40, respectively. The central cylindrical portion extends into the recess 36 and the flanges 39, 40 cooperate with the upper and lower edges of the top 35 of the rocker arm. The valve plug 37 is provided with a depending extension 41 which has an enlarged head 42 at the bottom thereof. The space between the lower surface of the flange 40 and the enlarged head 42 is filled by a tapered ring member 43 which may be of any suitable sealing material and which cooperates with a tapered seat at the top of the inlet portion 13. Similarly, the sealing portion 43a on the valve plug 37a cooperates with a tapered seat at the top of the inlet port 13a.

The top 35 of the rocker arm is provided with a centrally located longitudinal slot 44 which is disposed beneath the valve operating member 24. A snap member or valve operating member 45 has a depending tubular portion 46 which extends through the slot 44 in the rocker arm. A coil spring 47 is disposed within the tubular portion 46 and bears against the pin 34 for normally urging the snap member 45 upwardly. The snap member is provided with end flanges 48, 48a which extend over the slot 44 and are adapted to cooperate with the upper surface of the top 35 of the rocker arm. Between the end flanges 48, 48a, the snap member is provided with a V-shaped slot 49 with which the wedge-shaped end 28 of the manual valve operating member 24 is adapted to cooperate. The tubular portion 46 of the snap member is provided with slots 50, 50a into which the pin 34 extends. Thus, the snap member 45 is pivotally mounted on the pin 34 but is movable relative thereto under the action of the hand operating member 24 and the spring 47, the snap member 45 and the operating member 24 being movable about their pivot points in opposite directions.

In the position of the various parts shown in Figure 1 of the accompanying drawing, the port 13a is closed by the valve plug 37a with the sealing material 43a contacting with the tapered seat around the edge of the port. In this position, the under surface of the top 35 of the rocker arm bears against the lower flange 40a on the valve plug 37a so as to force the same into tight sealing contact with the seat around the edge of the port 13a. The handle 24 and the tip 28 thereof are out of alignment with the central axis of the operating member 45 with the operating member 45 shifted toward the closed port. The tip 28 of the operating member is also directed toward the closed port 13a, but the exposed handle portion 24 is inclined toward the open port 13 so as to serve as an indicator. The flange 48a on the operating member 45 bears against the upper surface of the top of the rocker arm and the spring 47 forces the flange 48a down upon the top of the rocker arm so as to exert a seating pressure on the valve plug 37a. The wedge-shaped tip 28 of the handle 24 serves as a bearing fulcrum, and the spring 47, being out of axial alignment therewith, tends to exert this seating pressure on the valve plug 37a through the flange 48a and the rocker arm. In this position of the valve assembly, fluid under pressure will enter the chamber 11 through the inlet conduit 14 and the inlet port 13 and pass outwardly through the common outlet port 15 and the discharge conduit 16.

When it is desired to shift the valve assembly so as to close the port 13 and open the port 13a, the handle 24 is shifted toward the left (Figure 1) in a counterclockwise direction. This movement of the handle 24 will cause slight depression of the operating member 45 which is moved in a clockwise direction, that is, toward the right (Figure 1), and this downward movement of the member 45 will effect compression of the spring 47. When the handle 24 and the operating member 45 reach a central neutral position with their longitudinal axes in alignment, the spring 47 will be compressed to a maximum degree. The slots 50, 50a in the tubular portion 46 of the member 45 permit this downward movement of said member. When the handle member is continued in this counterclockwise movement, the compressed spring 47 will rapidly force the member 45 in a clockwise direction and the handle 24 in a counterclockwise direction to an opposite extreme position with the flange 48 bearing against the top of the rocker arm. When the parts have reached this position, the valve plug 37 will be tightly seated around the edge of the port 13 so as to close the same. Thus, a rapid snap action is effected for closing either of the ports when the operating handle 24 is shifted minutely beyond a neutral position because the longitudinal axes of the handle 24 and the member 45 become out of alignment and the spring 47, which is compressed in the neutral position, rapidly urges and snaps the member 45 to either extreme position. The slot 44 in the rocker arm permits this independent movement of the operating member 45 during initial shifting from one position of the valve assembly to another. In this position of the valve assembly, the tip 28 and the member 48 will be directed toward the closed port 13, but the exposed handle portion 24 will be directed toward the open port 13a.

It will be seen, therefore, that the present invention provides a highly efficient valve assembly wherein a rapid snap movement is imparted to the rocker arm when it is manually shifted beyond a neutral and central intermediate position. When the rocker arm is shifted to a position for closing the port 13, the under surface thereof will bear against the lower flange 40 on the valve plug 37 and force the same downwardly. Similarly, the upper surface of the top of the rocker arm at the opposite end thereof will engage the upper flange 39a on the valve plug 37a to elevate the same. It is to be also noted that the valve plugs 37, 37a are carried in the recesses 36, 36a, respectively, at the ends of the oppositely directed arms of the rockable member 31 in such a manner that they have limited movement relative thereto. Thus, the valve plugs tend to center themselves with respect to the seats around their respective ports so that a tight seal is immediately effected. The ribs 17, 17a at the ends of the valve body 10 also cooperate with the recesses 36, 36a, respectively, at the ends of the rocker arm to properly guide the rocker arm in its rocking movement from one position to another. Movement of the operating member 45 from one extreme position to a central neutral position by manipulation of the handle 24 serves to lower the operating member 45 and thus compress the spring 47 so as to store up energy therein for the subsequent snap action when the handle 24 is shifted beyond a neutral position for closing one or the other of the ports 13 or 13a.

In Figures 5 and 6, modified forms of rocker arm are shown. In Figure 5, each opposite end 52 of the rocker arm 31a is bent upwardly at a slight angle with respect to the plane of the top portion 35a of the rocker arm 31a. Each end 52 is provided with a slot 53 for receiving one of the valve plugs 37a, as previously pointed out. In Figure 6, each end 52a of the rocker arm 31b is shaped to provide a recess 54 surrounding the slot 55 therein. Each recess is of greater depth at the closed or inner edge of the end 52a. The purpose of these alternative forms of rocker arm is to more accurately position the valve plugs with respect to their corresponding valve seats so as to guard against any jamming or cocking of the valve plugs. Thus, the lower pointed ends of the valve plugs will be more accurately directed toward their respective valve seats. The inclination of the ends 52 of the rocker arm 31a and the inclined surfaces of each recess 54 at the ends of the rocker arm 31b is such that these surfaces in which the slots are located are disposed in a plane which is substantially at right angles to the central axis of the port and valve seat to be closed. Thus, pressure on the rocker arm will act straight downwardly, that is, this pressure will act along and parallel to the axis of the corresponding port and the valve plug which is to close this port.

While one form of the invention has been shown in the accompanying drawing for purposes of illustration, it is to be clearly understood that various changes in the details of construction and arrangement of parts may be made without departing from the scope of the invention as set forth in the appended claims.

I claim:

1. A valve assembly for controlling the passage of fluid, comprising a valve casing having a plurality of ports communicating therewith, a rocker arm pivotally mounted within said casing and having a central opening therein, a pair of valve members for controlling the passage of fluid through at least a pair of said ports, said valve members being loosely carried adjacent the ends of said rocker arm whereby each valve member is automatically centered with respect to its corresponding port when closed, a valve operating member extending through the opening in said rocker and having laterally extending flanges engageable therewith, means for pivotally mounting said operating member within said valve casing, spring means for normally urging said operating member away from its pivotal mounting whereby to cause one of said flanges to rapidly engage said rocker arm whereby to effect a snap movement of the rocker arm and the valve members carried thereby, and handle means for effecting movement of said operating member toward a central position.

2. A valve assembly for controlling the passage of fluid, comprising a valve casing having a plurality of ports communicating therewith and ribs disposed at opposite ends thereof, a rocker arm pivotally mounted within said casing and having open slots at the ends thereof into which said ribs extend, a pair of valve members for controlling the passage of fluid through at least a pair of said ports, said valve members being carried within the slots at the ends of said rocker arm whereby each valve member is automatically centered with respect to its corresponding port when closed, and means for effecting the rapid shifting of said rocker arm beyond a central position whereby to effect a snap closing of one or the other of said ports.

3. A valve assembly for controlling the passage of fluid, comprising a valve casing having a plurality of ports communicating therewith and ribs disposed at opposite ends thereof, a rocker arm pivotally mounted within said casing and having open slots at the ends thereof into which said ribs extend, a pair of valve members for controlling the passage of fluid through at least a pair of said ports, said valve members being carried within the slots at the ends of said rocker arm whereby each valve member is automatically centered with respect to its corresponding port when closed, a spring operated member for effecting the rapid movement of said rocker arm when said member is shifted beyond a central position whereby to effect a snap closing of one or the other of said ports, and handle means for shifting said spring operated member from one of its extreme positions toward its central position.

4. A valve assembly for controlling the passage of fluid, comprising a valve casing having a plurality of ports communicating therewith, a rocker arm pivotally mounted within said casing, valve means for controlling the passage of fluid through at least a pair of said ports, said valve means being disposed adjacent the ends of said rocker arm and adapted to become automatically centered with respect to their corresponding ports when closed, an operating member pivotally mounted within said casing and extending centrally through said rocker arm, spring means for normally urging said operating member away from its pivotal connection, flange means on said operating member for engaging opposite sides of said rocker arm, and a handle member extending through said casing and engaging said operating member for shifting the said operating member from either extreme position to a central position whereby to compress said spring means, and said spring means operating to effect a rapid movement of said operating member into engagement with said rocker arm whereby to effect a snap closing of one or the other of said ports.

5. A valve assembly for controlling the passage of fluid, comprising a valve casing having an internal chamber provided with a plurality of ports communicating therewith, a pivot pin mounted within said casing and extending centrally thereacross, a rocker arm pivotally mounted on said pivot pin, valve members for controlling the passage of fluid through at least a pair of said ports, said valve members being loosely carried adjacent the ends of said rocker arm whereby each valve member is automatically centered with respect to its corresponding port when closed, an operating member having a slot into which said pivot pin extends whereby to pivotally mount said operating member within the valve casing and to permit limited endwise movement thereof relative to said pivot pin, spring means disposed within said operating member and bearing against said pivot pin for normally urging said operating member away from said pivot pin, flanges at opposite sides of said operating member for engaging the opposite sides of said rocker arm, and a handle member extending through said casing and engaging said operating member for effecting movement of said operating member from either extreme position to a central position whereby to compress said spring means, and said spring means operating to effect rapid engagement of one of the flanges with said rocker arm when the operating member is shifted beyond the central position whereby to effect a snap closing of one or the other of said ports.

6. A valve assembly for controlling the passage of fluid, comprising a valve casing having a plurality of ports communicating therewith, a rocker arm pivotally mounted within said casing and having open slots at the ends thereof, the surface of the ends of said rocker arm around said slots being inclined with respect to the center part of said rocker arm and adapted to be disposed in a plane substantially at right angles to the axis of a port when closed, a pair of valve members for controlling the passage of fluid through at least a pair of said ports, said valve members being carried within the slots adjacent the ends of said rocker arm whereby each valve member is centered with respect to its corresponding port when closed, and means for shifting said rocker arm whereby to alternately open or close one or another of said ports.

7. A valve assembly for controlling the passage of fluid, comprising a valve casing having a plurality of ports communicating therewith, a rocker arm pivotally mounted within said casing and having recesses at the opposite ends thereof and opening outwardly, the surfaces of said recesses being inclined with respect to the planes of the center part of said rocker arm and having open slots therein, a pair of valve members for controlling the passage of fluid through at least a pair of said ports, said valve members being carried within the slots adjacent the ends of said rocker arm whereby each valve member is centered with respect to its corresponding port when closed, and means for shifting said rocker arm whereby to alternately close or open one or another of said ports.

8. A valve assembly for controlling the passage of fluid, comprising a valve casing having a plurality of ports communicating therewith, a rocker arm pivotally mounted within said casing and having slots substantially in the plane thereof and opening at the ends thereof toward the casing, a pair of valve members for controlling the passage of fluid through at least a pair of said ports and each valve member being loosely carried within the slots on said rocker arm whereby each valve member is automatically centered with respect to its corresponding port when closed, and means including a spring operated member for effecting the rapid shifting of said rocker arm from a central position whereby to effect a snap closing of one or the other of said ports.

9. A valve assembly for controlling the passage of fluid, comprising a valve casing having a plurality of ports communicating therewith, a rocker arm within said casing, pivot means for mounting said rocker arm in said casing, a pair of valve members carried by said rocker arm for controlling the passage of fluid through at least a pair of said ports, an operating member pivotally mounted within said casing and contacting directly with said rocker arm for effecting shifting thereof whereby to open or close one or the other of said ports, spring means bearing against said pivot means and said operating member for effecting rapid shifting of the operating member from a central position whereby to effect a snap closing of one or the other of said ports, and handle means for shifting said operating member toward a central position whereby to permit opening of one of the ports and rapid closing of the other of said ports.

10. A valve assembly for controlling the passage of fluid, comprising a valve casing having a plurality of ports communicating therewith, a rocker arm within said casing, pivot means for mounting said rocker arm in said casing, a pair of valve members carried by said rocker arm for controlling the passage of fluid through at least a pair of said ports, an operating member pivotally mounted on said pivot means within the casing and contacting directly with said rocker arm for effecting shifting thereof whereby to open or close one or the other of said ports, and spring means bearing against said pivot means and said operating member for effecting rapid shifting of the operating member from a central position whereby to effect a snap closing of one or the other of said ports.

11. A valve assembly for controlling the passage of fluid, comprising a valve casing having a plurality of ports communicating therewith, a rocker arm within said casing, pivot means for mounting said rocker arm in said casing, a pair of valve members carried by said rocker arm for controlling the passage of fluid through at least a pair of said ports, an operating member pivotally mounted on said pivot means within the casing and contacting directly with said rocker arm for effecting shifting thereof whereby to open or close one or the other of said ports, spring means bearing against said pivot means and said operating member for effecting rapid shifting of the operating member from a central position whereby to effect a snap closing of one or the other of said ports, and handle means for shifting said operating member toward a central position whereby to permit opening of one of the ports and rapid closing of the other of said ports.

12. A valve assembly for controlling the passage of fluid, comprising a valve casing having a plurality of ports communicating therewith, a rocker arm within said casing, pivot means for mounting said rocker arm in said casing, a pair of valve members carried by said rocker arm for controlling the passage of fluid through at least a pair of said ports, an operating member disposed within said casing and contacting directly with said rocker arm for effecting shifting thereof whereby to open or close one or the other of said ports, means pivotally mounting said operating member on said pivot means for limited movement toward and away from said pivot means, and spring means bearing against said pivot means and said operating member and normally urging said operating member away from said pivot means and for effecting rapid shifting of the operating member from a central position whereby to effect a snap closing of one or the other of said ports.

13. A valve assembly for controlling the passage of fluid, comprising a valve casing having a plurality of ports communicating therewith, a rocker arm pivotally mounted within said casing, a pair of valve members carried by said rocker arm for controlling the passage of fluid through at least a pair of said ports, an operating member having a pivotal mounting within said casing and adapted to contact directly with said rocker arm for shifting the same, a handle member pivotally carried by said casing and bearing directly on said operating member for effecting movement thereof whereby to open or close one or the other of said ports, and spring means bearing on the pivotal mounting for said operating member and on said operating member for supporting the said operating member between the pivotal mounting and the handle member whereby to effect a snap closing of one or the other of said ports when the operating member is moved from a central position.

14. A valve assembly for controlling the passage of fluid, comprising a valve casing having a plurality of ports communicating therewith, a rocker arm within said casing, pivot means for mounting said rocker arm in said casing, a pair of valve members carried by said rocker arm for controlling the passage of fluid through at least a pair of said ports, an operating member disposed within said casing and contacting directly with said rocker arm for effecting shifting thereof whereby to open or close one or the other of said ports, means pivotally mounting said operating member on said pivot means for limited movement toward and away from said pivot means, spring means bearing against said pivot means and said operating member and normally urging said operating member away from said pivot means and for effecting rapid shifting of the operating member from a central position whereby to effect a snap closing of one or the other of said ports, and means providing a recess in said rocker arm, said operating member extending through said recess but being guided by said rocker arm.

15. A valve assembly for controlling the passage of fluid comprising a valve casing having a plurality of ports communicating therewith, an arm pivotally mounted within said casing and having a free end thereof extending over one of said ports, means carried by the casing and cooperating with the free end of said arm for guiding the same in a plane of movement passing centrally through said port, a valve member carried by said arm and freely shiftable longitudinally of the arm, said valve member having a tapered surface adapted to enter said port whereby said valve member will be automatically centered in the port when in closed position and means for shifting said arm for opening and closing said port.

16. A valve assembly for controlling the passage of fluid comprising a valve casing having a plurality of ports communicating therewith, an arm pivotally mounted within said casing and having a free end thereof extending over one of said ports, a rib carried by the casing, the free end of said arm being slotted for engagement with said rib whereby the arm is guided in the plane of movement passing centrally through the port, a valve member mounted in the slotted end of the arm and freely shiftable longitudinally of the arm, said valve member having a tapered surface adapted to enter the port whereby said valve member will be automatically centered in the port when in closed position, and means for shifting said arm for opening and closing the valve.

ARTHUR L. PARKER.